United States Patent
Decoodt et al.

(10) Patent No.: US 8,673,801 B2
(45) Date of Patent: Mar. 18, 2014

(54) PROCESS FOR REGENERATING A REFORMING CATALYST

(75) Inventors: Xavier Decoodt, Carrieres S/Seine (FR); Sébastien Durand, Rueil-Malmaison (FR); Pierre-Yves Le-Goff, Brunstatt (FR); Stéphane Wermester, Chatou (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 278 days.

(21) Appl. No.: 12/739,329

(22) PCT Filed: Oct. 17, 2008

(86) PCT No.: PCT/FR2008/001463
§ 371 (c)(1),
(2), (4) Date: Apr. 22, 2010

(87) PCT Pub. No.: WO2009/087309
PCT Pub. Date: Jul. 16, 2009

(65) Prior Publication Data
US 2010/0311566 A1 Dec. 9, 2010

(30) Foreign Application Priority Data
Oct. 26, 2007 (FR) ..................... 07 07605

(51) Int. Cl.
| | | |
|---|---|---|
| B01J 38/04 | (2006.01) | |
| B01J 38/42 | (2006.01) | |
| B01J 38/44 | (2006.01) | |
| B01J 38/12 | (2006.01) | |
| B01J 38/30 | (2006.01) | |
| B01J 38/34 | (2006.01) | |
| B01J 38/20 | (2006.01) | |
| B01J 38/14 | (2006.01) | |

(52) U.S. Cl.
USPC ................... 502/37; 502/34; 502/35; 502/38; 502/41; 502/43; 502/49; 502/52

(58) Field of Classification Search
USPC ....................................................... 502/20–56
See application file for complete search history.

(56) References Cited

U.S. PATENT DOCUMENTS

| | | | |
|---|---|---|---|
| 5,034,117 A | 7/1991 | De Bonneville et al. | |
| 5,053,371 A * | 10/1991 | Williamson | ................ 502/37 |
| 5,854,162 A | 12/1998 | Dufresne et al. | |
| 6,461,992 B1 | 10/2002 | Sechrist et al. | |

FOREIGN PATENT DOCUMENTS

| | | |
|---|---|---|
| EP | 0378482 A1 | 7/1990 |
| EP | 0710502 A1 | 5/1996 |

* cited by examiner

Primary Examiner — Jennifer Smith
(74) Attorney, Agent, or Firm — Millen, White, Zelano & Branigan, P.C.

(57) ABSTRACT

The invention concerns a process for regenerating a catalyst for the production of aromatic hydrocarbons or for reforming. Said process comprises a step for combustion in a zone A comprising at least 2 beds A1 and A2, a step for oxychlorination in a zone B, and a step for calcining in a zone C. A portion of the effluent gas from the oxychlorination zone is recycled via at least one scrubbing section D to the inlet to beds A1 and A2. Further, a portion of the effluent gas from zone B is recycled, passing via a blower and without passing via said scrubbing section D, to the combustion bed A2.

9 Claims, 2 Drawing Sheets

PROCESS FOR REGENERATING A REFORMING CATALYST

The invention relates to the regeneration of reforming catalysts and catalysts for the production of aromatic hydrocarbons.

In general, said catalysts are used for the conversion of naphthenic or paraffinic hydrocarbons, which are capable of being transformed by dehydrocyclization and/or dehydrogenation, during reforming or the production of aromatic hydrocarbons (for example the production of benzene, toluene, or ortho-, meta or para-xylene). Said hydrocarbons derive from fractionating crude oil by distillation or by other transformation processes.

One of the means for increasing the yields of said reforming or aromatics production processes is to reduce the operating pressures at which the various reactions of interest are carried out. As an example, 30 years ago the reforming reactions were carried out at 40 bars (1 bar=0.1 MPa). 20 years ago, it was 15 bars. Currently, reforming reactors routinely operate at pressures of less than 10 bars, in particular in the range 3 to 8 bars.

However, the improvement in beneficial reactions due to the reduction in pressure is accompanied by more rapid deactivation of the catalyst by coking. Coke or coke precursors are compounds essentially constituted by carbon and hydrogen. They are deposited on the active sites of the catalyst. The H/C molar ratio of the coke formed and of its precursors is generally in the range 03 to 1.0. The carbon and hydrogen atoms generally form condensed polyaromatic structures with a variable degree of crystalline organization which depends on the nature of the catalyst and the operational conditions of the reactors. While the transformation selectivity of the hydrocarbons into coke is very low, the quantities of coke and coke precursors accumulated on the catalyst may become substantial. For fixed bed units, such quantities are generally in the range 2.0 to 35.0% by weight. For moving bed units, said quantities are generally below 10.0% by weight.

Coke deposition, which is faster at low pressures, necessitates more rapid regeneration of the catalyst. Current regeneration cycles may be as fast as 2 or 3 days.

PRIOR ART

European patents EP-0 872 276 B and EP-0 872 277 B concern the regeneration of reforming catalysts. They concern processes for regenerating a reforming catalyst, comprising successive steps of combustion, oxychlorination and calcining.

The process of the present invention comprises at least two combustion beds A1 and A2 and is different from the processes described in the two patents EP-0 872 276 B and EP-0 872 277 B in that a portion of the effluent from the oxychlorination zone is recycled via a blower to the final combustion bed A2.

SUMMARY OF THE INVENTION

The invention concerns a process for regenerating a catalyst for the production of aromatic hydrocarbons or for reforming, said process comprising a step for combustion in a zone A comprising at least 2 beds A1 and A2, a step for oxychlorination in a zone B, and a step for calcining in a zone C. A portion of the effluent gas from the oxychlorination zone is recycled via at least one scrubbing section D to the inlet to beds A1 and A2. Further, a portion of the effluent gas from zone B is recycled to the combustion bed A2, passing via a blower but without passing via said scrubbing section D.

DETAILED DESCRIPTION OF THE INVENTION

The catalyst to be regenerated generally comprises a support, said support comprising at least one refractory oxide and/or one or more zeolites. It comprises at least one noble metal, preferably platinum, and at least one halogen. It may comprise one or more additional elements selected from the group constituted by elements from group Ia, IIa, lanthanides, elements from group IVa, preferably silicon and/or tin, elements from group IIIb, elements from group IIIa, preferably indium, elements from group Va, preferably phosphorus, and elements from group VIIb, preferably rhenium (the number of the groups correspond to the CAS classification in the CRC Handbook of Chemistry and Physics, published by CRC Press, Editor-in-Chief D R Lide, $81^{st}$ edition, 2000-2001).

In a preferred implementation, the catalyst comprises at least platinum, chlorine and an alumina support.

Because of the high cost of platinum, it is important to disperse the metallic phase as much as possible, i.e. to increase the proportion of platinum in contact with the surface and the molecules to be transformed. The specific surface area of the metal (surface area expressed per gram of metal) must be a maximum in order to obtain as high a degree of conversion as possible. Thus, a drop in accessibility, equivalent to an increase in particle size or the elementary particles collecting together, is highly prejudicial to the productivity of the reaction.

Thus, the aim is to minimize the particle size during preparation and to maintain this high degree of dispersion. The presence of chlorine in a sufficient quantity constitutes a response to this problem.

The inventors have now shown that recycling part of the effluent from the oxychlorination zone via a blower to the final combustion bed A2 supplies the bed A2 with chlorinating agent. This supply thereby reduces the elution of chlorine and reduces the consumption of chlorinating agent. Said recycle can reduce sintering of platinum and thus encourages its effective re-dispersion during oxychlorination step. B.

This improvement in redispersion is more effective when the catalyst contains increased quantities of poison such as iron.

Combustion zone A comprises at least 2 combustion beds A1 and A2, preferably 2 beds A1 and A2. Said beds are preferably moving, radial beds.

Oxychlorination zone B comprises at least one bed. Said beds are generally moving beds. Preferably, said beds are also axial.

Calcining zone C comprises at least one bed. Said beds are generally moving beds. Preferably, said beds are also axial.

Combustion Bed A1

In bed A1, the catalyst is generally treated at a pressure of 3 to 8 bars and at a temperature in the range 350° C. to 550° C. with a combustion gas comprising 0.01% to 1.3% by volume of oxygen and circulating as a co-current with the catalyst. The gas in bed A1 generally derives from mixing a portion of the gas from oxychlorination zone B with a portion of the gas from bed A2.

Second Combustion Bed A2

In bed A2, the catalyst is generally treated at a pressure of 3 to 8 bars. This pressure is generally substantially equal to that prevailing in bed A1.

The temperature in bed A2 is generally higher than that prevailing in bed A1 by at least 20° C.

Combustion in bed A2 generally takes place in the presence of gas which has moved through bed A1 and in the presence of a portion of the effluent deriving from the outlet from the oxychlorination zone B. Further, an inert makeup gas, preferably nitrogen, may optionally be added to bed A2. Further, dry makeup air may optionally be added to bed A2.

The aim is for the catalyst to be in contact with a gas comprising in the range 0.01% to 1.3% by volume of oxygen, these gases moving as a co-current to the catalyst.

Oxychlorination Zone B

In oxychlorination zone B, the catalyst is generally treated as a counter-current by mixing with a gas comprising oxygen which derives:

in part from the calcining zone;
optionally, in part by an oxygen makeup, preferably in the form of air;
optionally, in part from a fraction of the gas derived from the scrubbing section and from the optional drying section.

Further, this mixture of gas supplying the oxychlorination zone generally comprises a makeup of at least one chlorinating agent. Further, this mixture of gases supplying the oxychlorination zone generally comprises a makeup of water or a water precursor.

Part of the gas from oxychlorination is recirculated to bed A2 via a blower.

The chlorinating agent or agents are generally selected from the group constituted by chlorine, hydrogen chloride and halogenated hydrocarbons containing less than 4 carbon atoms and 1 to 6 chlorine atoms.

As an example, it may be $C_2Cl_4$, $CCl_4$ or any chlorinating agent known to release chlorine in such regeneration processes. They are preferably introduced as a mixture with the oxygen-containing gas.

When the oxychlorination zone is composed of moving and axial beds, in general it is introduced into the lower portion of the oxychlorination zone so that it flows as a counter-current to the catalyst.

The water is generally supplied in the liquid or vapour form, preferably in the vapour form. The water or water precursor may generally be supplied to the oxychlorination zone mixed with the oxygen-containing gas.

The $H_2O/HCl$ molar ratio in zone B is generally in the range 1 to 50, preferably in the range 1 to 40, and more preferably in the range 1 to 30.

The oxychlorination step is carried out in the presence of a gas generally comprising less than 40%, preferably less than 30%, and more preferably less than 21% by volume of oxygen, highly preferably in the range 4% to 21% by volume of oxygen, and still more preferably in the range 10% to 21% by volume of oxygen and generally at least 50 ppm by weight of chlorine, at a temperature which is generally in the range 350° C. to 600° C., preferably in the range 350° C. to 550° C., more preferably in the range 450° C. to 550° C., still more preferably in the range 490° C. to 550° C.

The pressure in this zone is generally 3 to 8 bars for moving bed processes, in particular for low pressure reforming processes. The residence time for the catalyst in the oxychlorination step is generally less than 3 hours, preferably in the range 30 minutes to 3 hours.

In a preferred implementation of the moving bed processes, at least one oxygen makeup is introduced into the oxychlorination zone.

In another preferred implementation of the moving bed processes, just one chlorinating agent and a water precursor are introduced into the oxychlorination zone. The oxygen present in the oxychlorination zone then derives from the gas deriving from the calcining zone.

In another preferred implementation of the moving bed processes, the gas supplying the oxychlorination zone results from mixing gas from the calcining zone with the makeup of the chlorinating agent or agents, with the water makeup or the water precursors and with the oxygen-containing gas or gases introduced into the oxychlorination zone. The oxygen-containing gas or gases may be a part of the gases from the final combustion bed which have been scrubbed, preferably dried and supplemented with an oxygen makeup as well as the gas which recirculates a portion of the effluent from the oxychlorination zone via a blower towards the oxychlorination zone.

Calcining Zone C

The calcining step is carried out in zone C in which the catalyst is treated for 20 to 160 minutes at a temperature in the range 350° C. to 600° C., at a pressure in the range 3 to 8 bars, by at least one makeup of oxygen-containing gas, preferably one makeup of oxygen-containing gas, preferably dry air, optionally mixed with a portion of the gases from the scrubbing section and the optional drying zone. The gas for supplying the calcining zone generally does not comprise more than 1% by volume of water, preferably no more than 0.1% by volume of water. Generally, it comprises, at most, 21% by volume of oxygen.

It generally moves as a counter-current to the catalyst in the case of moving bed processes with an axial calcining zone.

According to one variant, the only makeup of oxygen-containing gas is made to the inlet to the calcining zone.

According to one variant, the only make-up of oxygen derives from a makeup of dry air to the calcining zone.

Scrubbing Section D and Drying Section E

The gaseous effluent from bed A2 is generally sent, as a mixture with a portion of the gaseous effluents from oxychlorination zone B, to the scrubbing section D. A portion of the effluent from this scrubbing section is purged and the other portion is generally sent to a drying section E, then generally sent to a compressor. A portion of the effluent from the compressor is generally sent to combustion beds A1 and A2 and an optional portion is sent to the oxychlorination and calcining zones.

In a preferred implementation, the catalyst is a moving bed catalyst in each of zones A, B and C.

DESCRIPTION OF FIGURES

Referring to FIG. 2, vessel 2 comprises a combustion zone A, an oxychlorination zone B and a calcining zone C. The combustion zone A comprises two combustion beds, A1 and A2.

Figure 1:
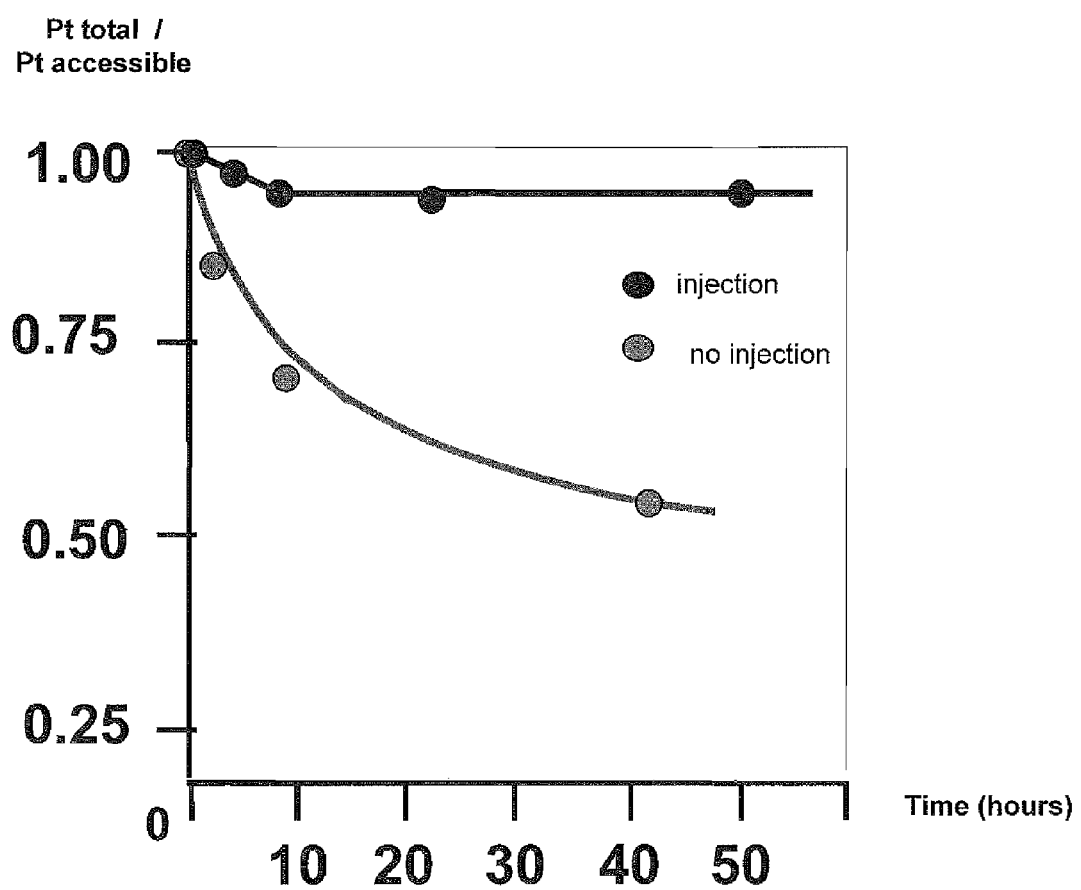
FIG. 1 illustrates the impact of injecting chlorine on platinum sintering as a function of time.

The catalyst is introduced via a line 1 to the head of the vessel F and then drops under gravity into the combustion bed A1 then A2, then via a line 3 from bed A2 to the oxychlorination zone B then to the calcining zone C, then leaves the vessel via a line 4.

Bed A1 comprises an inlet for gas moving via a line 10 and an outlet for gas moving via a line 24.

The bed A2 comprises an inlet for gas moving via a line 23 and an outlet for gas moving via a line 5 then via a chiller 36.

Zone B comprises an inlet for gas moving via a line 8 and an outlet for gas moving via a line 17. Further, a makeup of chlorinating agent moves via a line 6 mixed with gas moving via a line 28 to supply the oxychlorination zone via line 8. Further, a makeup of water or a water precursor moves via a line 7 and, mixed with the gas moving via a line 25, moves via a line 28 then via a furnace 19 for introduction to the oxychlorination step via a line 8 mixed with the makeup of chlorinating agent moving via line 6.

Zone C comprises an inlet for gas moving via a line 14.

The various gas recirculation pathways are described below:

Recirculation 1

Part of the effluent gas from oxychlorination zone B moves via line 17, then it is cooled by a chiller 35 and moves via a line 33, then via a blower 18 then via a line 20 then via a line 30 then via line 31 then via line 23.

Recirculation 2

A portion of the effluent gas from oxychlorination zone B moving via line 17 is chilled by the chiller 35 then moves via a line 32 for mixing with the gas from combustion bed A2 which moves via line 5. This mixture passes through a scrubbing section D via a line 37, then is purged in part via a line 29 and the other portion is sent to a drying section E then to a compressor 26. The effluent from the drying section E moves via line 38 then in part via line 9 then in part via line 27 then via a valve 22, then is sent to bed A2 via a line 30 then line 31 then line 23. The other portion of the gas mixture moving via line 9 is sent via line 10 to a furnace 13 and then is injected into the first combustion bed A1.

Recirculation 3

The effluent gas from A1 passes via line 24 and is mixed with the gas passing via line 31 to supply the second combustion bed via line 23. The gas moving via line 31 corresponds to the mixture of gas moving via line 30 with the optional makeup 21 of oxygen-containing gas.

Recirculation 4

A makeup of chlorinating agent is injected via line 6 and is mixed with the gas deriving from line 28 for injection via line 8 to the oxychlorination zone.

Recirculation 5

A portion of the gas moving via line 38 is recycled via line 9 to the combustion beds A1 and A2 and a portion via line 11 to the calcining zone and to the oxychlorination zone.

A portion of the gas moving via line 11 is sent to zone B via line 15 then 25 then 28 then 8. Another portion may be mixed with a makeup of dry air moving via line 12, passing via the furnace 16, and then sent to the calcining step via line 14.

EXAMPLES

Example 1

Figure 2:
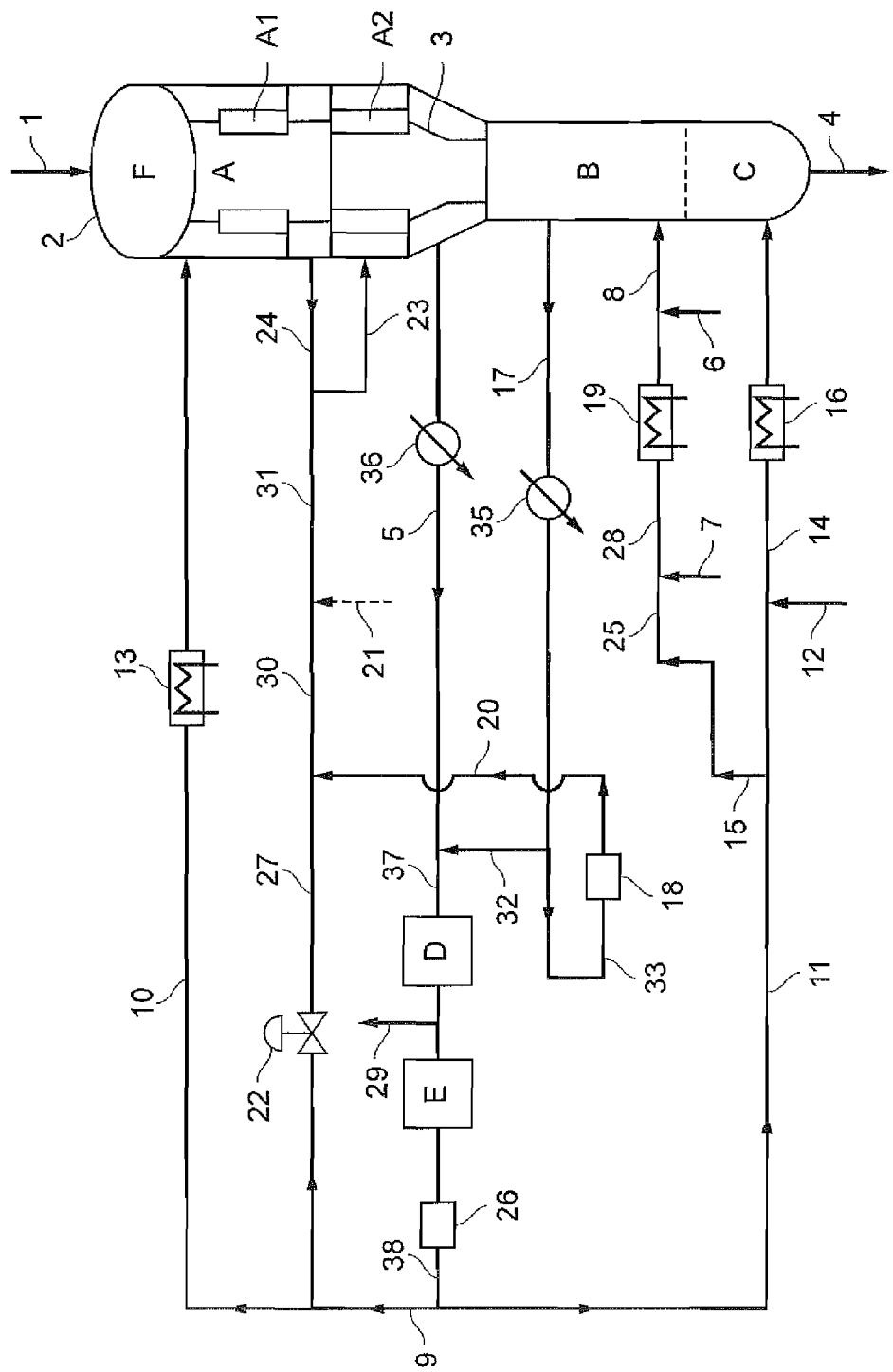
FIG. 2 shows an implementation of the invention.

The flowchart of FIG. 2 corresponds to the flowchart of the invention used for the simulation carried out with Troll software.

The temperature of the gases injected into the inlet to the calcining zone and to the inlet to the oxychlorination zone was 510° C. for the base flowchart and the flowchart of the invention.

The flow rates for the mixtures of gases moving via the various lines are shown in Table 1.

The base flowchart illustrates the case in which recirculation, via the blower, of effluent from the oxychlorination zone to the inlet to the second combustion bed was not used (see the zero flow rate for gases moving via lines 20 and 33). The flowchart of the invention illustrates the case in which recycling was carried out.

TABLE 1

Flow rates of gases moving in the various lines

| Zone concerned | Lines | Base flowchart: gas flow rates (kg/h) | Flowchart of invention: gas flow rates (kg/h) |
|---|---|---|---|
| 1st combustion bed | Line 10 | 23629 | 23629 |
| 2nd combustion bed | Line 23 | 27452 | 27954 |
| | Line 27 | 2943 | 2797 |
| | Line 21 | 880 | 0 |
| | Line 20 | 0 | 1528 |
| Calcining zone | Line 14 | 1180 | 1180 |
| | Line 12 | 469 | 1348 |
| Gas introduced into oxychlorination zone | Line 8 | 1180 | 1180 |
| | Line 6 | 5.1 | 5.0 |
| | Line 7 | 9 | 10 |
| Effluent from oxychlorination zone | Line 17 | 2374 | 2356 |
| Blower | Line 33 | 0 | 1528 |

In the layout of the invention, 101 ppm by volume of HCl was produced at the outlet from the second combustion bed as opposed to 78 ppm by volume of HCl for the base layout.

Example 2

Tests were carried out in a fixed bed reactor in order to characterize the influence of the presence of chlorine in the second combustion bed. This test was representative of the conditions recorded in the second combustion bed.

To this end, a chlorinated platinum-on-alumina-support catalyst with an initial chlorine content of 1.1% by weight was tested in an atmosphere of air with 10000 ppm of water, a flow rate of 2000 Nl/kg/h and at a temperature of 650° C. The test was carried out for a period of 60 hours.

Chlorine was injected into the reactor to produce a stable chlorine content throughout the test of 1.1% by weight (+/− 0.2% by weight).

Because of the high cost of platinum, it is important to disperse the metallic phase as much as possible, i.e. to increase the proportion of platinum in contact with the surface and the molecules to be transformed. The specific surface area of the metal (surface area expressed per gram of metal) must be a maximum in order to obtain as high a degree of conversion as possible. Thus, a drop in accessibility, equivalent to an increase in particle size or the elementary particles collecting together, is highly prejudicial to the productivity of the reaction. Thus, the aim is to minimize the particle size during preparation and to maintain this high degree of dispersion. The presence of a sufficient quantity of chlorine may constitute an answer to this problem.

The term "accessibility" as used in the present invention is the quantity of platinum which is accessible to the feed to be converted with respect to the total quantity of platinum present on the catalyst. A reduction in accessibility corresponds to sintering of the platinum.

The platinum accessibility was measured by $H_2/O_2$ titration.

$H_2/O_2$ titration consists of measuring the volume of oxygen consumed by reaction (1) after a step for reducing the catalyst in hydrogen.

$$Pt_s-H+\tfrac{3}{4}O_2 \rightarrow Pt_s-O+\tfrac{1}{2}H_2O \qquad (1)$$

where $Pt_s$ designates superficial platinum atoms.

The catalyst was reduced in hydrogen at 450° C. then, after cooling in hydrogen to ambient temperature, known volumes of oxygen were injected. The oxygen consumption was followed by chromatography; integrating the signals produced, by difference with the total injected volume, allows the volume of oxygen consumed by reaction (1) to be determined. The stoichiometric coefficients of reaction (1) were used to determine the fraction of surface platinum or accessibility using the relationship:

$$D = \frac{4VO_2 M_{Pt}}{3V_M \cdot [\%\ Pt]}$$

in which:
$M_{Pt}$: molar mass of platinum (195.09 g/mol);
$V_M$: molar volume of gas (24400 ml/mol) at 25° C.;
$VO_2$: measured volume corresponding to oxygen consumption;
% Pt: weight content of platinum in catalyst.

FIG. 1 shows a lower accessibility over time and thus greater sintering of platinum without injection of chlorine.

Recirculating the oxychlorination effluent to the inlet to the second combustion bed allows chlorine to be supplied and thus encourages non-sintering of the platinum.

These results illustrate the advantage of recycling a portion of the effluent from the oxychlorination zone via a blower in part towards the combustion bed A2. It supplies chlorinating agent to the combustion bed A2, thereby reducing elution of the chlorine. It can also significantly reduce sintering of the platinum and as a result encourages its effective redispersion during the oxychlorination step.

The invention claimed is:

1. A process for regenerating a catalyst for the production of aromatic hydrocarbons or for reforming, comprising:
   a) combustion in a combustion zone A comprising at least two combustion beds, a first bed A1 and a second bed A2 in series;
   b) oxychlorination in an oxychlorination zone B comprising at least one oxychlorination bed, said oxychlorination zone B being supplied with at least one chlorinating agent, at least with water or water precursors and at least with an oxygen-containing gas;
   c) calcining in a calcining zone C comprising at least one calcining bed supplied with a gas comprising at least a makeup of dry air;

in which:
   said catalyst comprises a support, chlorine and at least one noble metal and moves in series in first bed A1 then in second bed A2, then in the oxychlorination zone B then in the calcining zone C;
   effluent gas from first bed A1 is sent to second bed A2;
   the gas supplying the calcining zone C moves freely towards the oxychlorination zone B;
   at least one makeup of oxygen-containing gas is made to the inlet to the calcining zone;
   a portion of effluent gas from the oxychlorination zone is recycled via at least one scrubbing section D towards the inlet to first combustion bed A1;
   at least a portion of effluent gas from the oxychlorination zone is recycled, passing via a blower, without passing through said scrubbing section D, directly to the second combustion bed A2;
   a portion of effluent gas from second combustion bed A2 is recycled via at least said scrubbing section D to the inlet to first combustion bed A1.

2. A process according to claim 1, in which in oxychlorination zone B, the temperature is in the range 350° C. to 600° C. and the residence time for the catalyst is in the range 30 minutes to 3 hours.

3. A process according to claim 1, in which in oxychlorination zone B, the quantity of oxygen in the oxygen-containing gas in contact with the catalyst is in the range 4% to 21% by volume.

4. A process according to claim 1, in which in the calcining zone C, the gas comprises at most 21% by volume of oxygen and at most 1% by volume of water.

5. A process according to claim 1, in which the only makeup of oxygen-containing gas is made to the inlet to the calcining zone.

6. A process according to claim 1, in which the chlorinating agent is chlorine.

7. A process according to claim 1, in which the catalyst is in a moving bed in each of zones A, B and C.

8. A process according to claim 1, in which the only makeup of oxygen derives from a makeup of dry air to the calcining zone.

9. A process according to claim 1, in which in calcining zone C, the temperature is in the range 350° C. to 600° C. and the pressure is in the range 3 to 8 bars.

* * * * *

UNITED STATES PATENT AND TRADEMARK OFFICE
CERTIFICATE OF CORRECTION

PATENT NO. : 8,673,801 B2  Page 1 of 1
APPLICATION NO. : 12/739329
DATED : March 18, 2014
INVENTOR(S) : Decoodt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Twenty-ninth Day of September, 2015

Michelle K. Lee
*Director of the United States Patent and Trademark Office*